US010002521B2

(12) United States Patent
Sanya et al.

(10) Patent No.: US 10,002,521 B2
(45) Date of Patent: Jun. 19, 2018

(54) SUPPRESSING NUISANCE ALARMS OF A FLOATING PRODUCTION, STORAGE AND OFFLOADING (FPSO) SURVEILLANCE SYSTEM

(71) Applicant: SHELL OIL COMPANY, Houston, TX (US)

(72) Inventors: Olumuyiwa Johnson Sanya, Aberdeen (GB); William Richard Byrne, Aberdeen (GB)

(73) Assignee: SHELL OIL COMPANY, Houston, TX (US)

( * ) Notice: Subject to any disclaimer, the term of this patent is extended or adjusted under 35 U.S.C. 154(b) by 0 days. days.

(21) Appl. No.: 15/506,199

(22) PCT Filed: Aug. 28, 2015

(86) PCT No.: PCT/EP2015/069722

§ 371 (c)(1),
(2) Date: Feb. 23, 2017

(87) PCT Pub. No.: WO2016/030496

PCT Pub. Date: Mar. 3, 2016

(65) Prior Publication Data

US 2017/0256159 A1 Sep. 7, 2017

(30) Foreign Application Priority Data

Aug. 29, 2014 (EP) .................................... 14182835

(51) Int. Cl.

| | |
|---|---|
| ***G01W 1/00*** | (2006.01) |
| ***G08B 29/18*** | (2006.01) |
| ***B63B 43/00*** | (2006.01) |
| ***B63B 25/08*** | (2006.01) |
| ***G08B 21/18*** | (2006.01) |
| *B63B 35/44* | (2006.01) |

(52) U.S. Cl.

CPC ............ *G08B 29/185* (2013.01); *B63B 25/08* (2013.01); *B63B 43/00* (2013.01); *G08B 21/182* (2013.01); *B63B 2035/448* (2013.01)

(58) Field of Classification Search

CPC .... G08B 29/185; G08B 21/182; B63B 43/00; B63B 25/08; B63B 2035/448

USPC .... 340/601, 853.3, 855.4, 603, 536.26, 985; 166/336, 344, 366

See application file for complete search history.

(56) References Cited

U.S. PATENT DOCUMENTS 3,525,988 A 8/1970 Linder
2010/0186652 A1* 7/2010 Martin .................... B63B 21/00
114/230.1

FOREIGN PATENT DOCUMENTS

EP 2419804 2/2012

* cited by examiner

*Primary Examiner* — Dhaval Patel

(57) ABSTRACT

A Floating Production, Storage and Offloading (FPSO) surveillance system (7) is equipped with an adjustable alarm threshold that suppresses nuisance alarms if liquid level variations in FPSO crude oil and/or other liquid storage tanks (6) monitored by the system do not exceed estimated oscillating liquid level variations due to oscillating motions of the FPSO unit (1) during severe weather conditions.

11 Claims, 2 Drawing Sheets

SUPPRESSING NUISANCE ALARMS OF A FLOATING PRODUCTION, STORAGE AND OFFLOADING (FPSO) SURVEILLANCE SYSTEM

CROSS-REFERENCE TO RELATED APPLICATIONS

The present application is a National Stage (§ 371) application of PCT/EP2015/069722, filed Aug. 28, 2015, which claims the benefit of European Application No. 14182835.0, filed Aug. 29, 2014, which is incorporated herein by reference in its entirety.

BACKGROUND OF THE INVENTION

The invention relates to a method and system for suppressing nuisance alarms of a Floating Production, Storage and Offloading (FPSO) surveillance system due to oscillating liquid level variations in FPSO crude oil and/or other liquid storage tanks resulting from oscillating motions of the FPSO unit during severe weather conditions.

FPSO surveillance systems are available from vendors, such as Moxa Inc. (URL: http://www.moxa.com/application/Alarm-to-Video_Monitoring_for_Offshore_Oil_Gas_FPSO.htm) and may be part of a Distributed Control System (DCS) used for integrated control of FPSO crude oil production, storage, treatment and offloading operations.

FPSO surveillance systems may comprise liquid level monitoring equipment which monitor a liquid level in FPSO crude oil and/or other liquid storage tanks and alarm FPSO operators if the liquid level changes rapidly and the speed of change exceed a preset threshold, for example due to a liquid leak or due to an excessive liquid influx into the FPSO storage tanks, for example due to pressure fluctuations in the FPSO risers and/or associated oil and/or gas production wells.

During severe weather conditions the FPSO unit will make oscillating motions due to wave and/or wind impact, which may induce waves in the FPSO crude oil and/or other liquid storage tanks, which may generate an excessive amount of nuisance alarms of the FPSO surveillance system.

There is a need for an improved FPSO surveillance system, which does not generate an excessive amount of nuisance alarms during severe weather conditions.

SUMMARY OF THE INVENTION

In accordance with the invention there is provided a method for suppressing nuisance alarms of a Floating Production, Storage and Offloading (FPSO) surveillance system due to oscillating liquid level variations in a FPSO storage tank during severe weather conditions, the method comprising:

providing the FPSO surveillance system with a FPSO storage tank level gauge with an adjustable alarm threshold; and inducing the FPSO surveillance system to:

monitor oscillating motions of the FPSO unit during severe weather conditions;

estimate oscillating liquid level variations in the FPSO storage tank due to the monitored oscillating motions of the FPSO; and adjust the adjustable alarm threshold to suppress nuisance alarms of the FPSO surveillance system if liquid level variations in the FPSO storage tank monitored by the FPSO storage tank level gauge do not exceed the estimated oscillating liquid level variations due to the monitored oscillating motions of the FPSO unit.

In accordance with the invention there is furthermore provided a Floating Production, Storage and Offloading (FPSO) surveillance system comprising:

an oscillating motion monitoring system for monitoring oscillating motions of the FPSO unit during severe weather conditions;

means for estimating liquid level variations in the FPSO storage tank due to the monitored oscillating motions of the FPSO unit; and an adjustable alarm threshold, which is configured to suppress nuisance alarms of the FPSO surveillance system monitoring system if the monitored liquid level variations do not exceed the estimated oscillating liquid level variations due to the monitored oscillating motions of the FPSO unit.

Optionally, the oscillating motion monitoring system comprises a tilt meter that is configured to identify a maximum FPSO inclination angle θ resulting from the oscillating motions of the FPSO unit;

the FPSO storage tank has a width W; and the alarm threshold of the FPSO tank liquid level gauge is configured to suppress nuisance alarms if a maximum liquid level variation $\Delta H_{max}$ of the crude oil in the FPSO storage tank does not exceed $(W/2)*\sin\theta$.

The FPSO surveillance system may be part of a Distributed Control System (DCS) that monitors and manages well effluent transfer and storage at the FPSO unit, and which DCS may comprise an acoustic and/or visual alarm system that alerts FPSO operating staff about potentially unsafe liquid level variations in the FPSO storage tank and the DCS comprises an alarm threshold that suppresses nuisance acoustic and/or visual alarms if the monitored liquid level variations do not exceed the estimated liquid level variations due to the monitored oscillating motions. The well effluents may comprise a multiphase mixture of crude oil, condensates, water and/or natural gas, which is at least partially separated at the FPSO unit and stored in at least one FPSO storage tank.

The FPSO unit may comprise an elongate turret moored floating vessel equipped with an FPSO tilt meter that is configured to identify an aggregated maximum inclination angle θ resulting from aggregated oscillating rolling, pitching and yawing motions of the elongate turret moored floating vessel during severe weather conditions.

Furthermore, the system according to the invention may comprise a computer readable medium, which, when connected to a computer, induces the computer to execute the method according to the invention.

These and other features, embodiments and advantages of the method and system according to the invention are described in the accompanying claims, abstract and the following detailed description of non-limiting embodiments depicted in the accompanying drawings, in which description reference numerals are used which refer to corresponding reference numerals that are depicted in the drawings.

Similar reference numerals in different figures denote the same or similar objects. Objects and other features depicted in the figures and/or described in this specification, abstract and/or claims may be combined in different ways by a person skilled in the art.

DETAILED DESCRIPTION OF THE DEPICTED EMBODIMENTS

Figure 1:
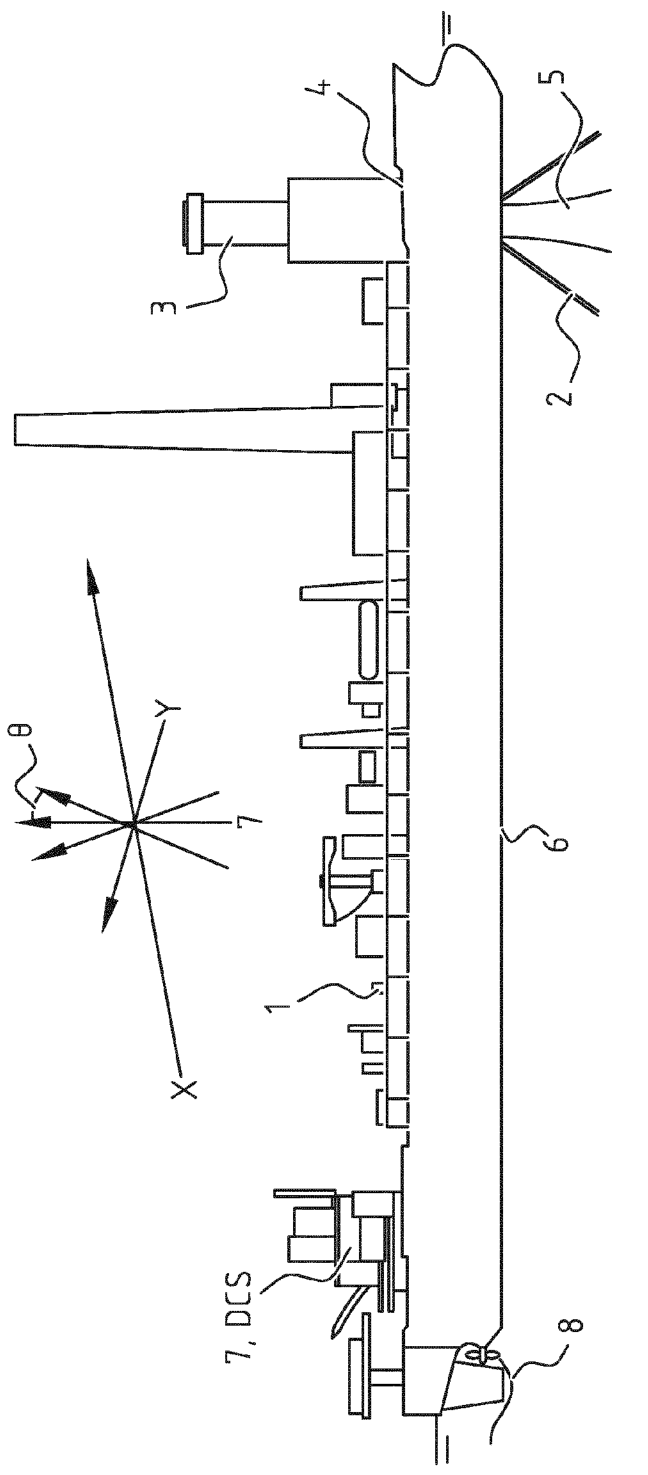
FIG. 1 schematically depicts how a FPSO unit may tilt during severe weather.

FIG. 1 depicts a FPSO unit 1, which is moored by mooring cables 2 that are connected to a turret 3, which is connected to the hull of the FPSO unit 1 by a swivel and bearing assembly 4 that permits the FPSO unit 1 to rotate about the turret 3 in response to changing directions of wind, waves, current and/or tide.

The FPSO unit 1 is connected to subsea oil and/or gas production wells (not shown) by subsea flowlines (not shown) that are connected to a flexible riser assembly 5.

Crude oil and/or gas produced from the subsea wells may be separated and/or otherwise treated at the FPSO unit 1 and temporarily stored in one or more FPSO crude oil and/or other liquid storage tanks 6 that may extend along at least a substantial part of the length and width of the hull of the FPSO unit 1.

From time to time crude oil export tankers (not shown) may be moored alongside or behind the FPSO unit and unload crude oil from the storage tanks 6 via a crude oil offloading hose 8.

The crude oil and/or other liquid level in the FPSO storage tanks 6 will therefore cyclically rise and fall and will be monitored by a FPSO surveillance system 7 that may be part of a Distributed Control System (DCS) that assist FPSO operators and other staff to monitor, safeguard and manage the overall production, performance, integrity and safety of the FPSO operations.

For this purpose the FPSO surveillance system 7 comprises level gauges that monitor the liquid level in the FPSO storage tanks 6 and that give an alarm if the liquid level changes rapidly, for example due to a pressure surge in the wells and/or production risers 5 and/or due to a damage or rupture of a production riser 5 and/or offloading hose (not shown).

The upper part of FIG. 1 also depict a three-dimensional view of a longitudinal axis X, a lateral axis Y and a vertical axis Z of the FPSO unit 1 and that during severe weather conditions due to wave, current, tide and/or wind impact the FPSO will make oscillating translational and rotational movements in all three directions X, Y and Z, which are generally identified as Heave, Surge, Sway, Pitch, Yaw and Roll.

For the elongate FPSO unit 1 shown in FIG. 1 the rolling motion generally is the largest oscillating movement, which will cause the vertical axis Z of the FPSO unit 1 to cyclically tilt to a maximum angle θ as shown at the top of FIG. 1.

During severe weather conditions sea waves will initiate significant oscillating rolling motion of the FPSO unit 1, which will also initiate significant waves of the crude oil and/or other liquid in the FPSO storage tanks 6.

Figure 2:
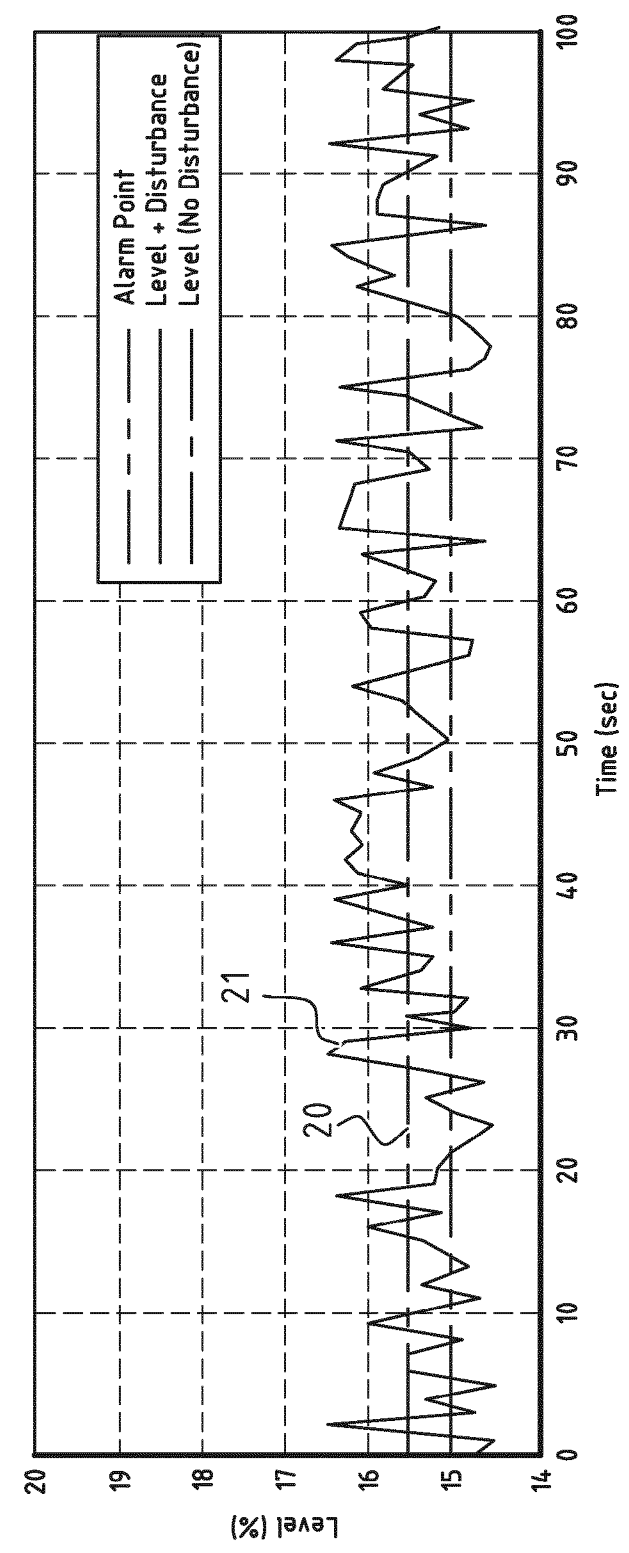
FIG. 2 depicts how waves in FPSO storage tanks may trigger nuisance alarms of a FPSO surveillance system during severe weather.

FIG. 2 shows a graph of the readings of a liquid level gauge of the FPSO surveillance system 7, wherein the horizontal upper line 20 shows the substantially stationary liquid level in the FPSO storage tanks 6 during a time interval of 100 seconds in calm weather conditions and the oscillating line 21 shows how the liquid level will fluctuate due to waves of the crude oil and/or other liquid in the FPSO tanks 6 during severe weather conditions.

The lower horizontal line 22 in FIG. 2 shows the alarm point at which the level gauge of the FPSO surveillance system 7 will give a visual and/or acoustic alarm to alert the FPSO operator about an exceptionally large change of the liquid level in the FPSO tanks 6.

FIG. 2 illustrates that in the example shown these changes solely result from the waves in the liquid and that this wave action triggers tens of nuisance alarms per minute.

In the FPSO surveillance system 7 according to the invention generation of nuisance alarms due to wave action in the FPSO tanks 6 during severe weather conditions is suppressed by inducing the FPSO surveillance system 7 to monitor the oscillating tilt angle θ of the FPSO unit at least due to the sway action about the longitudinal axis X and to suppress nuisance alarms of the liquid level gauge or gauges if the liquid level variations ΔH in the FPSO storage tanks do not exceed (W/2)*sin θ, or in other words by formula:

$$\Delta \leq H(W/2)*\sin\theta,$$

wherein:

- ΔH is the liquid level oscillation in a FPSO storage tank 6 measured by the level gauge;
- W is the width of the FPSO storage tank 6;
- θ is the maximum tilt angle of the FPSO unit 1; and
- (W/2)*sin θ is an estimated oscillating liquid level variation due to waves of the liquid in the FPSO storage tank 6 due to severe weather conditions.

It will be understood that the above formula may be provided with an empirically determined correction coefficient and that the FPSO surveillance system 7 and method according to the invention will effectively suppress nuisance alarms that are solely due to wave action of the liquid stored in the FPSO storage tanks 6 without reducing the sensitivity of the FPSO surveillance system 7 for rapid liquid level changes in the FPSO storage tanks 6 due to leaks and/or pressure surges.

The FPSO unit 1 may be equipped with one or more storage tanks 6 for storage of crude oil, water, condensates, fuel and/or other liquids, which may each be equipped with liquid level gauges and alarms for exceptional liquid level variations.

If the FPSO unit 1 is relatively short then also pitching motions may be significant and taken into account in addition to the swaying motions. In such case the FPSO surveillance system may monitor a maximum aggregated tilt angle $\theta_a$, which is an accumulation of the maximum sway angle $\theta_s$ and a maximum pitch angle $\theta_p$ and in such case the width W of the FPSO storage tank or tanks 6 may be measured in a vertical plane in which the aggregated tilt angle $\theta_a$ resides.

It will be understood that the FPSO unit 1 may be moored in a sea, lake, ocean and that a skilled person may make various modifications and alterations to the FPSO surveillance method and system according to the invention as described in the foregoing detailed description of depicted embodiments and shown in the associated drawings without exercising inventive skills.

Therefore, the system and method according to the present invention are well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising,"

"containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may cited herein by reference, the definitions that are consistent with this specification should be adopted.

The invention claimed is:

1. A method for suppressing nuisance alarms of a Floating Production, Storage and Offloading (FPSO) surveillance system due to oscillating liquid level variations in a FPSO storage tank during severe weather conditions, the method comprising:

providing the FPSO surveillance system with a FPSO storage tank level gauge with an adjustable alarm threshold; and inducing the FPSO surveillance system to:

monitor oscillating motions of the FPSO unit during severe weather conditions;

estimate oscillating liquid level variations in the FPSO storage tank due to the monitored oscillating motions of the FPSO; and adjusting the adjustable alarm threshold to suppress nuisance alarms of the FPSO surveillance system if liquid level variations in the FPSO storage tank monitored by the FPSO storage tank level gauge do not exceed the estimated oscillating liquid level variations due to the monitored oscillating motions of the FPSO unit.

2. The method of claim 1, wherein:

the FPSO surveillance system comprises an FPSO tilt meter that identifies a maximum FPSO tilt angle θ resulting from the oscillating motions of the FPSO unit during severe weather conditions;

the FPSO storage tank has a width W; and the alarm threshold is set to suppress nuisance alarms if a maximum liquid level variation $\Delta H_{max}$ of the liquid in the FPSO storage tank measured by the liquid level gauge does not exceed (W/2)*sin θ.

3. The method of claim 2, wherein the FPSO unit is an elongate turret moored floating vessel and the maximum FPSO tilt angle θ and the width W of the FPSO storage tank are measured in a lateral plane that is orthogonal to a longitudinal axis of the vessel.

4. The method of claim 2, wherein the FPSO unit is an elongate turret moored floating vessel and the FPSO tilt meter identifies an aggregated maximum tilt angle $\theta_a$ resulting from aggregated oscillating rolling, pitching and yawing motions of the FPSO unit during severe weather conditions and the width W of the FPSO storage tank is measured in a vertical plane in which the aggregated maximum tilt angle $\theta_a$ resides.

5. A Floating Production, Storage and Offloading (FPSO) surveillance system comprising:

an oscillating motion monitoring system for monitoring oscillating motions of the FPSO unit during severe weather conditions;

means for estimating liquid level variations in the FPSO storage tank due to the monitored oscillating motions of the FPSO unit; and a FPSO storage tank level gauge with an adjustable alarm threshold, which is configured to suppress nuisance alarms of the FPSO surveillance system monitoring system if the liquid level variations monitored by the FPSO level gauge do not exceed the estimated oscillating liquid level variations due to the monitored oscillating motions of the FPSO unit.

6. The system of claim 5, wherein:

the oscillating motion monitoring system comprises a tilt meter that is configured to identify a maximum FPSO inclination angle θ resulting from the oscillating motions of the FPSO unit;

the FPSO storage tank has a width W; and the alarm threshold of the liquid level gauge is configured to suppress nuisance alarms if a maximum liquid level variation $\Delta H_{max}$ of the crude oil in the FPSO storage tank does not exceed (W/2)*sin θ.

7. The system of claim 6, wherein the FPSO surveillance system is part of a Distributed Control System (DCS) that monitors and manages well effluent transfer and storage at the FPSO unit.

8. The system of claim 7, wherein the DCS comprises an acoustic and/or visual alarm system that alerts FPSO operating staff about potentially unsafe liquid level variations in the FPSO storage tank and the DCS comprises an alarm threshold that suppresses nuisance acoustic and/or visual alarms if the monitored liquid level variations do not exceed the estimated liquid level variations due to the monitored oscillating motions.

9. The system of claim 7, wherein the well effluents comprise a multiphase mixture of crude oil, condensates, water and/or natural gas, which is at least partially separated at the FPSO unit and stored in at least one FPSO storage tank.

10. The system of claim 5, wherein the FPSO unit comprises an elongate turret moored floating vessel equipped with an FPSO tilt meter that is configured to identify an aggregated maximum inclination angle θ resulting from aggregated oscillating rolling, pitching and yawing motions of the elongate turret moored floating vessel during severe weather conditions.

11. The system of claim 5 comprising a non-transitory computer readable medium, which, when connected to a computer, induces the computer to execute a method or suppressing nuisance alarms of the FSPO surveillance system.

* * * * *